United States Patent
Yamamoto et al.

(10) Patent No.: US 8,947,298 B2
(45) Date of Patent: Feb. 3, 2015

(54) GNSS RECEIVER AND POSITIONING METHOD

(75) Inventors: Takuya Yamamoto, Nisshin (JP); Yoshinori Kadowaki, Toyota (JP); Akihiro Yanai, Toyota (JP); Yoh Satoh, Miyoshi (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 302 days.

(21) Appl. No.: 13/581,407

(22) PCT Filed: Mar. 28, 2011

(86) PCT No.: PCT/IB2011/000654
§ 371 (c)(1), (2), (4) Date: Aug. 27, 2012

(87) PCT Pub. No.: WO2011/124959
PCT Pub. Date: Oct. 13, 2011

(65) Prior Publication Data
US 2013/0016007 A1 Jan. 17, 2013

(30) Foreign Application Priority Data
Apr. 6, 2010 (JP) .................................. 2010-087949

(51) Int. Cl.
*G01S 19/43* (2010.01)
*G01S 19/22* (2010.01)
*G01S 19/37* (2010.01)
*H04B 1/7075* (2011.01)

(52) U.S. Cl.
CPC ................. *G01S 19/22* (2013.01); *G01S 19/37* (2013.01); *H04B 1/7075* (2013.01); *H04B 2201/70715* (2013.01)
USPC .................................................... 342/357.26

(58) Field of Classification Search
USPC .............. 342/357.26, 357.31, 357.37, 357.61
See application file for complete search history.

(56) References Cited

U.S. PATENT DOCUMENTS 6,249,542 B1   6/2001   Kohli et al.
7,453,961 B1 *  11/2008   Li et al. ......................... 375/343
(Continued)

FOREIGN PATENT DOCUMENTS

EP   2 086 055 A1   8/2009
JP   2002-156439 A   5/2002
(Continued)

OTHER PUBLICATIONS

International Search Report and Written Opinion for corresponding International Patent Application No. PCT/IB2011/000654 issued on Aug. 8, 2011.
(Continued)

*Primary Examiner* — Harry Liu
(74) *Attorney, Agent, or Firm* — Sughrue Mion, PLLC

(57) ABSTRACT

A GNSS receiver includes: a first correlation peak detecting unit (1102) that detects a peak of a correlation value between a positioning signal and a C/A code replica signal; a second correlation peak detecting unit (1104) that detects a peak of the correlation value through a multipath error reduction technique; a signal intensity detecting unit (110, 112) that detects a signal intensity of the positioning signal; a switching unit (108) that inputs the positioning signal to the second correlation peak detecting unit (1104) when the signal intensity is higher than or equal to a threshold, and inputs the positioning signal to the first correlation peak detecting unit (1102) when the signal intensity is lower than the threshold; a pseudo-range calculation unit (114) that calculates a pseudo-range based on the detected correlation peak; and a positioning calculation unit (116) that calculates a location of the GNSS receiver based on the pseudo-range.

5 Claims, 7 Drawing Sheets

(56) References Cited

U.S. PATENT DOCUMENTS

| | | | |
|---|---|---|---|
| 8,395,543 B2 * | 3/2013 | van Diggelen et al. | 342/357.61 |
| 8,571,088 B2 * | 10/2013 | Pon | 375/150 |
| 2009/0168925 A1 * | 7/2009 | Shirai | 375/340 |

FOREIGN PATENT DOCUMENTS

| | | |
|---|---|---|
| JP | 2007-256112 A | 10/2007 |
| JP | 2008-070338 A | 3/2008 |
| JP | 2010-249620 A | 11/2010 |
| JP | 2011-209056 A | 10/2011 |

OTHER PUBLICATIONS

International Preliminary Report on Patentability for corresponding International Patent Application No. PCT/IB2011/000654 issued on Mar. 28, 2012.

* cited by examiner

GNSS RECEIVER AND POSITIONING METHOD

BACKGROUND OF THE INVENTION

1. Field of the Invention

The invention relates to a GNSS receiver and positioning method that receive a signal from an orbit satellite for a global navigation satellite system (GNSS) for positioning.

2. Description of the Related Art

Satellite navigation (GNSS) is a navigation system in which three navigation satellites (GNSS orbit satellites) (hereinafter, referred to as "GNSS satellites") are captured from an airplane to acquire distances from the respective GNSS satellites and then time is set using a signal from the fourth navigation satellite to thereby make it possible to obtain a three-dimensional flying position of the airplane. The satellite navigation includes a global positioning system (GPS), a GALILEO, and the like.

For example, a GNSS receiver is equipped for a mobile unit to measure the location and speed of the mobile unit. For example, the GNSS receiver receives radio waves from a plurality of GNSS satellites to calculate respective distances (pseudo-ranges) from the plurality of GNSS satellites to the GNSS receiver to thereby position the mobile unit equipped with the GNSS receiver on the basis of the calculated pseudo-ranges. Signals emitted from the GNSS satellites reach the GNSS receiver with a delay of a period of time during which a radio wave propagates the distance between each of the GNSS satellites and the GNSS receiver. Thus, when a period of time required for radio wave propagation is obtained for the plurality of GNSS satellites, the location of the GNSS receiver may be obtained through positioning calculation. For example, a pseudo-range calculation unit of the GNSS receiver uses radio waves emitted from the plurality of GNSS satellites to obtain a pseudo-range from each GNSS satellite to the GNSS receiver. Then, a positioning calculation unit obtains the location of the GNSS receiver on the basis of the pseudo-ranges obtained by the pseudo-range calculation unit.

The GNSS receiver captures a GNSS satellite and then examines the correlation between the signal received from the GNSS satellite and a C/A code replica signal to thereby detect a correlation peak. For example, the correlation peak between the C/A code replica signal and the signal received from the GNSS satellite is obtained by adjusting the phase of the C/A code replica signal. The GNSS receiver obtains a pseudo-range between the GNSS satellite and the GNSS receiver from a phase delay of the correlation peak. The location of the GNSS receiver is obtained on the basis of the pseudo-range.

However, even when the GNSS receiver has succeeded in capturing a GNSS satellite, the GNSS receiver may receive not only a direct wave from the GNSS satellite but also a radio wave reflected or diffracted from an architecture, such as a tall building. A phenomenon that a radio wave transmitted from a GNSS satellite is reflected or diffracted and is received through a plurality of propagation paths is called multipath. The influence of multipath causes an error in pseudo-range between the GNSS receiver and the GNSS satellite. An error in pseudo-range causes a positioning error.

One of causes of a positioning error in the GNSS receiver is the influence of multipath. One of methods for reducing the influence of multipath may be a multipath error reduction technique, such as narrow-correlator. An error in pseudo-range may be reduced using the multipath error reduction technique. Because an error in pseudo-range may be reduced, a positioning error may reduced.

FIG. 1 shows an example of the GNSS receiver.

A radio wave from a GNSS satellite is input to a high-frequency processing unit 2 through an antenna. The high-frequency processing unit 2 processes a high-frequency analog signal input through the antenna. A satellite capturing unit 4 captures the GNSS satellite on the basis of the signal processed by the high-frequency processing unit 2. A correlator unit 6 examines the correlation between the signal received from the GNSS satellite captured by the satellite capturing unit 4 and the C/A code replica signal to thereby detect a correlation peak.

FIG. 2 shows an example of processing performed by the correlator unit 6. In FIG. 2, the abscissa axis represents a chip, and the ordinate axis represents a signal intensity level of a correlation value.

For example, in the correlator, tracking is performed so that the width between an early (E) and a late (L) (hereinafter, referred to as "spacing") is 1 chip and the difference in signal intensity level between the correlation values is zero. In FIG. 2, phase control is performed so that the signal intensity levels (indicated by 0.5E and 0.5L) of the correlation values at both ends of the 1-chip spacing are equal to each other. The middle of the spacing is a tracking point. The phase of the C/A code replica signal is adjusted to maximize the tracking point to thereby obtain a maximum value P (referred to as "correlation peak") of the tracking point. Because of the influence of multipath, the maximum value of the tracking point may deviate to the early side or the late side.

In order to reduce the influence of multipath, after the tracking, the spacing is narrowed, and the signal intensity levels (indicated by NE and NL) of correlation values at chips that are further close to the chip corresponding to the correlation peak obtained by the one-ship spacing are obtained. Phase control is performed so that NE is equal to NL. The middle of the spacing is a tracking point. The phase of the CIA code replica signal is adjusted to maximize the tracking point to thereby obtain a correlation peak.

A pseudo-range calculation unit 8 obtains a pseudo-range between the GNSS receiver and the GNSS satellite on the basis of a phase delay of the correlation peak detected when the spacing is narrowed by the correlator unit 6.

When the spacing is narrowed and then the signal intensity levels of correlation values at chips that are further close to the chip corresponding to the correlation peak obtained by the 1-chip spacing, variations in correlation values through phase control are small because NE and NL are close to the correlation peak When the level of a signal of a radio wave received from the GNSS satellite decreases and, therefore, the influence of noise increases, the received signal level of noise may possibly be higher than that of NE or NL because of small variations in correlation values through phase control. When the received signal level of noise is higher than that of NE or NL, it is impossible to obtain correlation values at chips that are further close to the chip corresponding to the correlation peak obtained by the 1-chip spacing although the spacing is narrowed. When correlation values cannot be obtained, the tracking GNSS satellite may be lost. When satellite tracking is lost, it is necessary to perform processing from satellite capturing again, and there is a possibility that positioning cannot be performed during the satellite capturing. Because positioning cannot be performed during then, the rate of positioning decreases.

SUMMARY OF INVENTION

The invention provides a GNSS receiver and positioning method that are able to improve the rate of positioning while reducing the influence of multipath.

A first aspect of the invention provides a GNSS receiver. The GNSS receiver performs positioning calculation on the basis of a positioning signal transmitted from a GNSS satellite. The GNSS receiver includes: a first correlation peak detecting unit that detects a peak of a correlation value between the positioning signal and a C/A code replica signal;

a second correlation peak detecting unit that detects a peak of the correlation value between the positioning signal and the C/A code replica signal through a multipath error reduction technique; a signal intensity detecting unit that detects a signal intensity of the positioning signal; a switching unit that inputs the positioning signal to the second correlation peak detecting unit when the signal intensity detected by the signal intensity detecting unit is higher than or equal to a predetermined threshold, and that inputs the positioning signal to the first correlation peak detecting unit when the signal intensity is lower than the predetermined threshold; a pseudo-range calculation unit that calculates a pseudo-range on the basis of the correlation peak detected by the first correlation peak detecting unit or the second correlation peak detecting unit; and a positioning calculation unit that calculates a location of the GNSS receiver on the basis of the pseudo-range calculated by the pseudo-range calculation unit.

In addition, in the GNSS receiver according to the first aspect, the first correlation peak detecting unit may use a first phase spacing to detect a peak of the correlation value between the positioning signal and the C/A code replica signal, and the second correlation peak detecting unit may use a second phase spacing that is narrower than the first phase spacing to detect a peak of the correlation value between the positioning signal and the C/A code replica signal.

In addition, in the GNSS receiver according to the first aspect, the signal intensity detecting unit may detect a predetermined first correlation value when the first correlation peak detecting unit detects a peak of the correlation value between the positioning signal and the C/A code replica signal, and the switching unit may input the positioning signal to the second correlation peak detecting unit when a signal intensity of the predetermined first correlation value detected by the signal intensity detecting unit is higher than or equal to a predetermined threshold, and may input the positioning signal to the first correlation peak detecting unit when the signal intensity of the first correlation value is lower than the predetermined threshold.

In addition, in the GNSS receiver according to the first aspect, the signal intensity detecting unit may detect a predetermined second correlation value when the second correlation peak detecting unit detects a peak of the correlation value between the positioning signal and the C/A code replica signal, and the switching unit may input the positioning signal to the second correlation peak detecting unit when a signal intensity of the predetermined second correlation value detected by the signal intensity detecting unit is higher than or equal to a predetermined threshold, and may input the positioning signal to the first correlation peak detecting unit when the signal intensity of the predetermined second correlation value is lower than the predetermined threshold.

In addition, in the GNSS receiver according to the first aspect, the multipath error reduction technique may include any one of a narrow-correlator, an early-late slope, a strobe-correlator and a multipath estimating delay-lock loop.

A second aspect of the invention provides a positioning method. The positioning method is used in a GNSS receiver that performs positioning calculation on the basis of a positioning signal transmitted from a GNSS satellite. The positioning method includes: detecting a peak of a correlation value between the positioning signal and a C/A code replica signal; detecting a peak of the correlation value between the positioning signal and the C/A code replica signal through a multipath error reduction technique; a signal intensity detecting unit that detects a signal intensity of the positioning signal; switching to detect the second correlation peak when the detected signal intensity is higher than or equal to a predetermined threshold and switching to detect the first correlation peak when the detected signal intensity is lower than the predetermined threshold; calculating a pseudo-range on the basis of the detected first correlation peak or the detected second correlation peak; and calculating a location of the GNSS receiver on the basis of the calculated pseudo-range.

In addition, in the positioning method according to the second aspect, the first correlation peak may be detected with a first phase spacing, and the second correlation peak may be detected with a second phase spacing that is narrower than the first phase spacing.

With the GNSS receiver according to the first aspect and the positioning method according to the second aspect, it is possible to improve the rate of positioning while reducing the influence of multipath.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Figure 1:
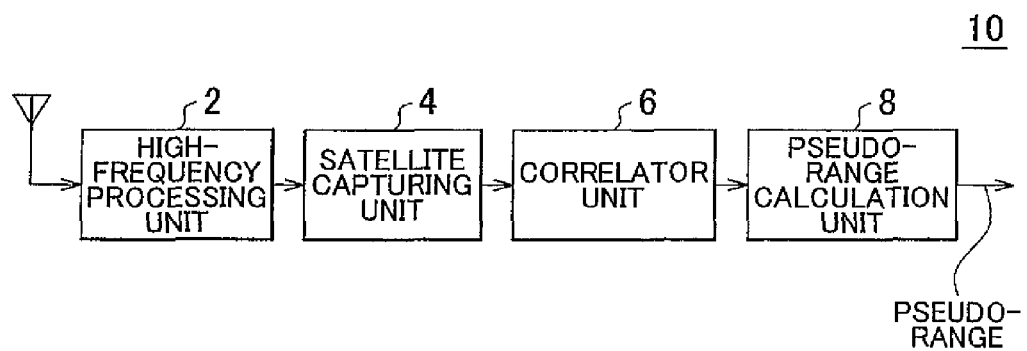
FIG. 1 is an example of a functional block diagram of a GNSS receiver according to a related art.
Figure 2:
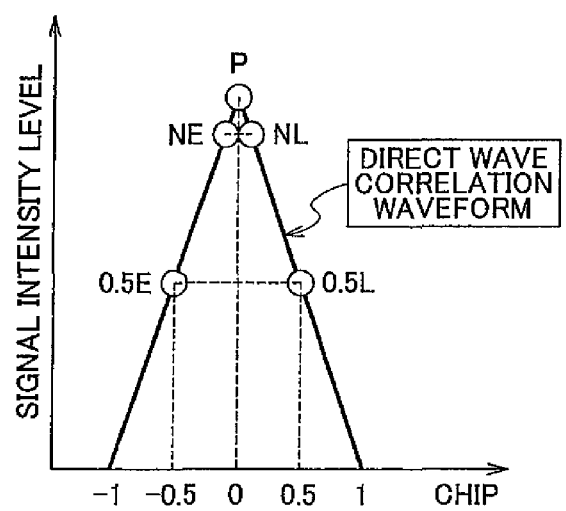
FIG. 2 is a view that illustrates an example of detecting the correlation between a positioning signal and a C/A code replica signal according to the related art.

Next, an embodiment of the invention will be described with reference to the accompanying drawings. Note that, in all the drawings for illustrating the present embodiment, like reference numerals denote components having the same functions, and the overlap description is omitted.

A global navigation satellite system (GNSS) according to the present embodiment includes GNSS satellites and a GNSS receiver 100. The GNSS satellites orbit around Earth. The GNSS receiver 100 is located on Earth and can move on Earth. In the present embodiment, a GPS will be described as an example of the GNSS. The aspect of the invention may be applied to a GNSS other than the GPS.

The GNSS satellites constantly broadcast navigation messages (satellite signals) toward Earth. Each navigation message contains satellite orbit information (ephemeris or almanac) related to a corresponding one of the GNSS satellites, a correction value of a clock and a correction factor of the ionosphere. The navigation messages are spread using a C/A code and are constantly broadcast toward Earth on an L1 carrier wave (frequency of 1575.42 MHz). In addition, the navigation messages are spread using a P code and are constantly broadcast toward Earth on an L2 carrier wave (frequency of 1227.6 MHz).

The L1 carrier wave is a composite wave of a sine wave modulated using the C/A code and a cosine wave modulated using the P code (Precision Code), and is subjected to quadrature modulation. In addition, the L2 carrier wave is a cosine wave modulated using the P code, and is subjected to quadrature modulation. Each of the C/A code and the P code is a pseudo noise code, and is a string of codes in which −1 and 1 are irregularly and periodically arranged.

Note that, currently, about 30 GNSS satellites orbit at an altitude of about 20,000 km above around Earth, there are six earth's orbital planes that are inclined 55 degrees each and four or more GNSS satellites are equally arranged along each orbital plane. Thus, wherever on Earth as long as under the open sky, at least five or more GNSS satellites may be constantly observed.

The GNSS receiver 100 is, for example, equipped for a mobile unit. The mobile unit includes a vehicle, a motorcycle, a train, a ship, an aircraft, a robot, an information terminal such as a mobile terminal that moves with movement of a user, and the like. In the present embodiment, the GNSS receiver 100 is equipped for a vehicle as an example of the mobile unit.

Figure 3:
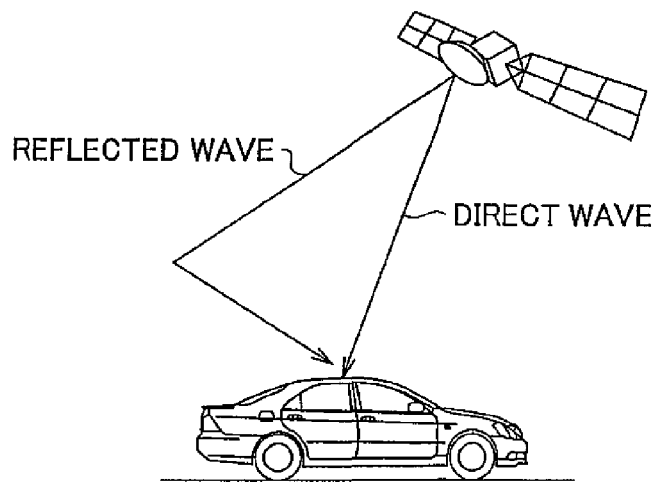
FIG. 3 is a view that illustrates radio waves received by a GNSS receiver according to an embodiment of the invention.

FIG. 3 shows radio waves received by the GNSS receiver 100. A signal received by the GNSS receiver 100 may be influenced by multipath. Specifically, the GNSS receiver 100 receives a direct wave and a reflected wave at the same time. The direct wave may be directly received from the GNSS satellite. The reflected wave is received in such a manner that a radio wave emitted from the GNSS satellite is reflected by an architecture, or the like. When the direct wave and the reflected wave are received at the same time, a correlation waveform of the received signals and the C/A code replica signal is a composite waveform of a correlation waveform between the direct wave and the C/A code replica signal and a correlation waveform between the reflected wave and the C/A code replica signal.

Figure 4:
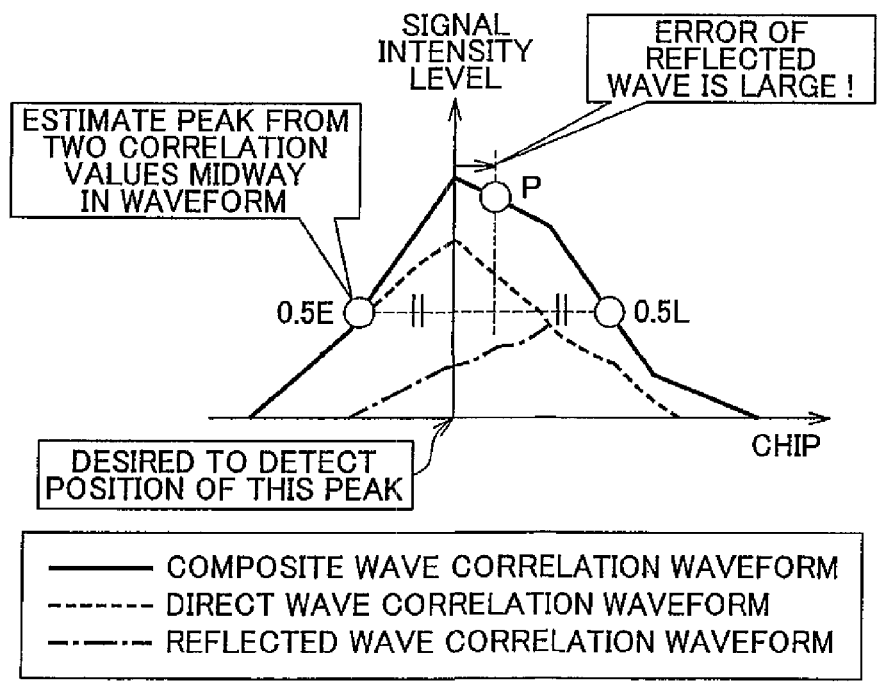
FIG. 4 is a first view that illustrates an error of a correlation peak due to the influence of multipath.
Figure 5:
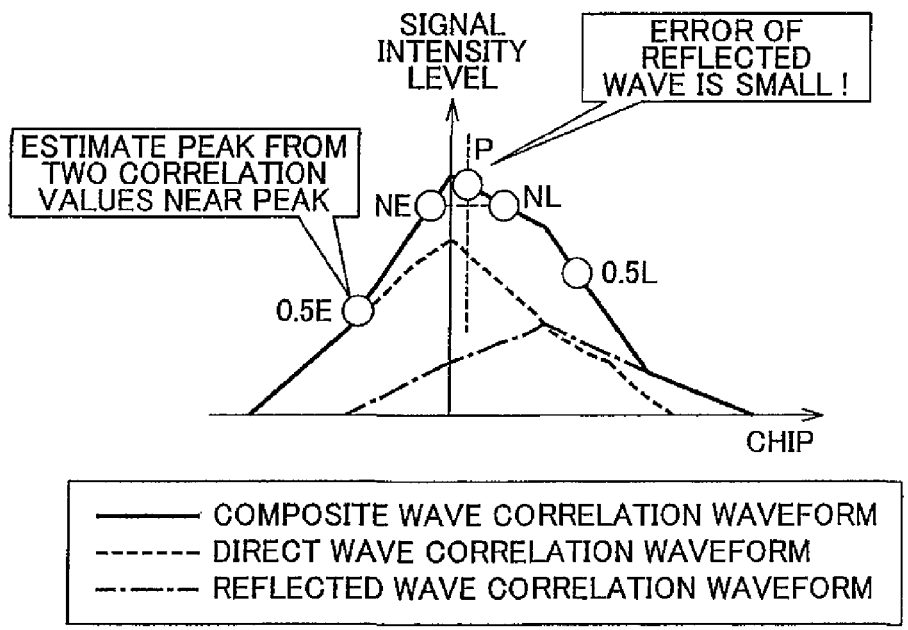
FIG. 5 is a second view that illustrates an error of a correlation peak due to the influence of multipath.

FIG. 4 and FIG. 5 respectively show correlation peaks that are obtained when tracking is performed by a correlator with different spacings. In FIG. 4 and FIG. 5, the abscissa axis represents a chip, and the ordinate axis represents a signal intensity level of a correlation value.

FIG. 4 shows a case where the spacing is wide. FIG. 4 shows a case of 1-chip spacing as an example.

When the spacing is 1 chip, for example, the phase of the C/A code replica signal is controlled so that 0.5E is equal to 0.5L. According to FIG. 4, a chip position corresponding to a correlation peak obtained from a correlation waveform of a received signal, including a direct wave and a reflected wave, and the C/A code replica signal delays in phase from a chip position corresponding to a correlation peak obtained from a correlation waveform of the direct wave and the C/A code replica signal. That is, an error occurs in the direction in which the phase of the code delays. Because the error occurs in the direction in which the phase of the code delays, a pseudo-range is calculated to be longer than it is.

FIG. 5 shows a case where the spacing is narrow. FIG. 5 shows a case of 0.1-chip spacing as an example. When the spacing is 0.1 chip, for example, the phase of the C/A code replica signal is controlled so that NE is equal to NL.

According to FIG. 5, a chip position corresponding to a correlation peak obtained from a correlation waveform of a received signal, including a direct wave and a reflected wave, and the C/A code replica signal delays in phase from a chip position corresponding to a correlation peak obtained from a correlation waveform of the direct wave and the C/A code replica signal. This is the same as that of the case where the spacing is wide. However, a difference between the chip position corresponding to the correlation peak obtained from the correlation waveform of the received signal, including the direct wave and the reflected wave, and the C/A code replica signal and the chip position corresponding to the correlation peak obtained from the correlation waveform of the direct wave and the C/A code replica signal is smaller when the spacing is narrow than when the spacing is wide. This is because phase control is performed at chips closer to the correlation peak when the spacing is narrow. Because the above difference is small, the phase delay error of the correlation peak is small. Because the phase delay error of the correlation peak is small, the influence of multipath may be reduced when the spacing is narrow.

The case where the signal intensity level of a signal from the GNSS satellite is low will be described.

Figure 6:
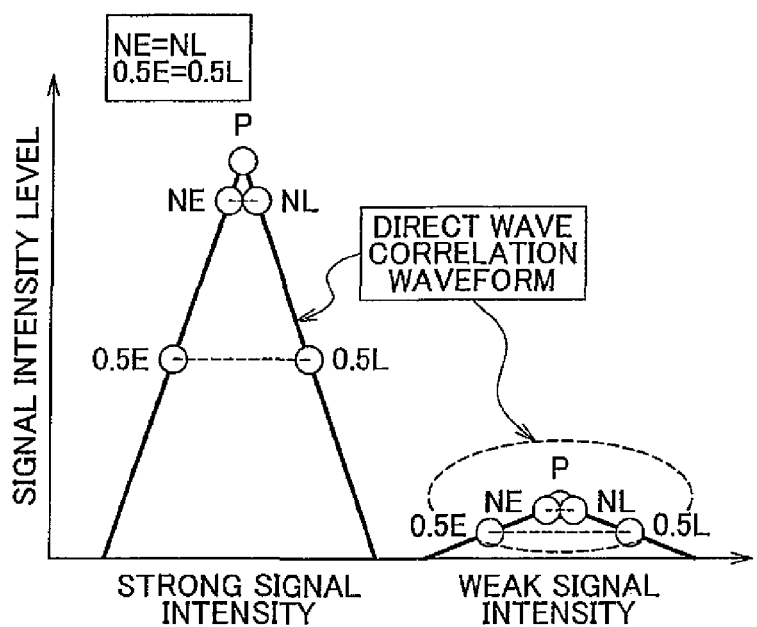
FIG. 6 is a view that illustrates an example of detecting the correlation between a positioning signal and a C/A code replica signal for different signal intensity levels of the positioning signal.

FIG. 6 shows a comparison between a correlation waveform when the signal intensity level of a signal from the GNSS satellite is high and when the signal intensity level is low. FIG. 6 shows an example of a correlation waveform of a direct wave. However, the similar correlation waveform is obtained when a reflected wave is included.

When the signal intensity level is high, a correlation peak is obtained irrespective of whether the spacing is wide or narrow. On the other hand, when the signal intensity level is low, a correlation peak may be obtained by controlling the phase of the C/A code replica signal in the case of a wide spacing; whereas a correlation peak may not be obtained even by adjusting the phase of the C/A code replica signal in the case of a narrow spacing. This is because a received signal including a direct wave and a reflected wave may be buried in noise.

Figure 7:
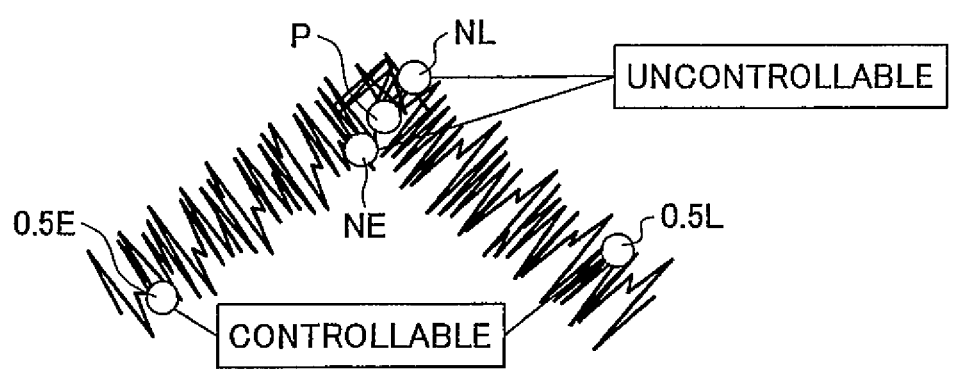
FIG. 7 is a view that illustrates an example of detecting the correlation between a positioning signal and a C/A code replica signal when the signal intensity level of the positioning signal is low.

FIG. 7 shows an enlarged correlation waveform when the signal intensity level is low. When the signal intensity level is low, the influence of noise increases. Because the influence of noise increases in the case of a narrow spacing, a correlation peak may not be obtained even by controlling the phase so that NE is equal to NL. This is because a received signal including a direct wave and a reflected wave may be buried in noise. In the example shown in FIG. 7, NL is higher than the correlation peak. A correlation peak cannot be obtained even by controlling the phase over NE and NL, so the tracking GNSS satellite may be lost.

When the tracking GNSS satellite is lost, it is necessary to start from satellite capturing again. This is because, once proceeding to the process of controlling the phase of the C/A code replica signal with a narrow spacing, it is impossible to return to the process of controlling the phase of the C/A code replica signal with a wide spacing.

The GNSS receiver 100 observes the intensity of a correlation value between a received signal and the C/A code replica signal. When the GNSS receiver 100 has captured a GNSS satellite, the GNSS receiver 100 controls the phase of the C/A code replica signal with a wide spacing. For example, the phase of the C/A code replica signal is controlled with a 1-chip spacing so that 0.5E is equal to 0.5L. When the phase of the CIA code replica signal is controlled with the wide spacing, the signal intensity level of the received signal is observed.

The GNSS receiver 100 determines whether the signal intensity level of the received signal is higher than or equal to a predetermined signal intensity level. When the determination result indicates that the signal intensity level of the received signal is higher than or equal to the predetermined signal intensity level, a multipath error is reduced using a multipath error reduction technique. The multipath error reduction technique includes any one of a narrow-correlator, an early-late slope, a strobe-correlator and a multipath estimating delay-lock loop (MEDLL). In the present embodiment, the narrow-correlator is employed as an example; however, another multipath error reduction technique as described above may be employed. In addition, in the present embodiment, the signal intensity level of a correlation value between a received signal and a C/A code replica signal is used as the level of the received signal. When it is determined that the signal intensity level of the correlation value is higher than or equal to a predetermined level, a multipath error is reduced using the multipath error reduction technique. Instead of the signal intensity level of a received signal, another value may be used to determine whether a multipath error is reduced using the multipath error reduction technique. For example, a received SINR or a received S/N may be used.

The GNSS receiver 100 obtains a correlation peak with a wide spacing, and then controls the phase of the C/A code replica signal with a narrow spacing. For example, the GNSS receiver 100 obtains a correlation peak with a 1-chip spacing as a wide spacing, and then obtains the signal intensity level of a correlation value at chips that are closer to the chip corresponding to the correlation peak with a narrow spacing. The GNSS receiver 100 performs phase control so that NE is equal to NL. The middle of the spacing is a tracking point. The phase of the C/A code replica signal is adjusted so as to maximize the tracking point to thereby obtain a correlation peak.

The GNSS receiver 100 determines whether the signal intensity level of the correlation peak is higher than or equal to a predetermined signal intensity level even while the phase of the C/A code replica signal is being controlled with the narrow spacing. For example, one epoch is used as a unit, and then the above determination may be made, for example, epoch by epoch. When the determination result indicates that the signal intensity level of the correlation peak is lower than the predetermined signal intensity level, control is switched so as to obtain a correlation peak with a wide spacing.

When it is determined that the signal intensity level of the correlation peak is lower than the predetermined signal intensity level while the phase of the C/A code replica signal is being controlled with a narrow spacing, the process is switched to the process of obtaining a correlation peak by controlling the phase of the C/A code replica signal with a wide spacing. By switching to the process of obtaining a correlation peak by controlling the phase of the C/A code replica signal with a wide spacing, it is possible to avoid phase uncontrollability due to a situation that the phase of the C/A code replica signal cannot be controlled with a narrow spacing. This is because, when the phase control cannot be performed, it is assumed that the signal intensity level of the correlation peak is low, and, when the signal intensity level of the correlation peak is low, the process is switched to the process of obtaining the correlation peak by controlling the phase of the C/A code replica signal with a wide spacing. Because the process is switched to the process of obtaining the correlation peak by controlling the phase of the C/A code replica signal with a wide spacing, it is possible to avoid phase uncontrollability of the C/A code replica signal due to continuation of the process of controlling the phase of the C/A code replica signal with a narrow spacing. Because the phase control of the C/A code replica signal is allowed, the tracking GNSS satellite is never lost. The tracking GNSS satellite is never lost, so it is possible to improve the rate of positioning. This is because it is not necessary to perform the process from satellite capturing again.

Figure 8:
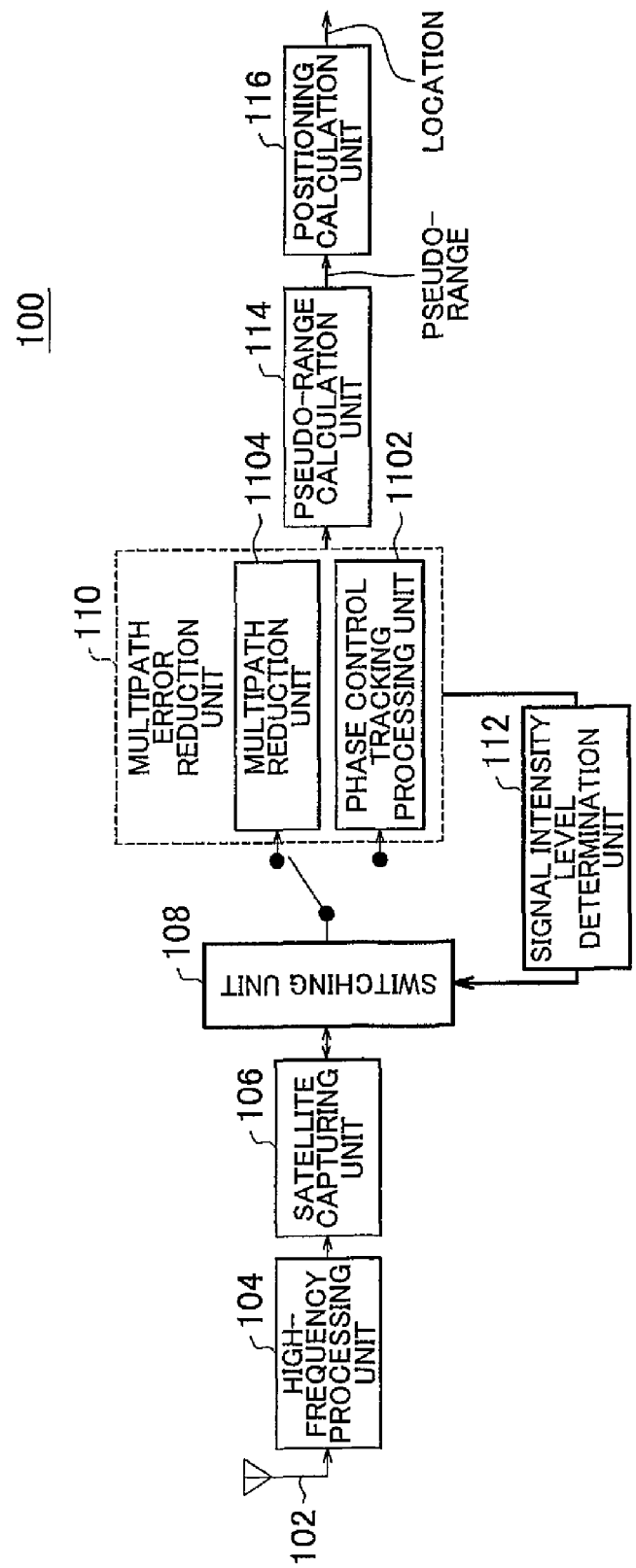
FIG. 8 is a functional block diagram of the GNSS receiver according to the embodiment of the invention.

FIG. 8 shows the GNSS receiver 100.

The GNSS receiver 100 includes an antenna 102. The antenna 102 receives a radio wave transmitted from a GNSS satellite. The radio wave received by the antenna 102 is input to a high-frequency processing unit 104 as a high-frequency signal.

The GNSS receiver 100 includes the high-frequency processing unit 104. The high-frequency processing unit 104 is connected to the antenna 102. The high-frequency processing unit 104 converts the high-frequency signal from the antenna 102 to an intermediate-frequency signal. The intermediate-frequency signal is input to a satellite capturing unit 106.

The GNSS receiver 100 includes the satellite capturing unit 106. The satellite capturing unit 106 is connected to the high-frequency processing unit 104. The satellite capturing unit 106 captures the GNSS satellite on the basis of the intermediate-frequency signal input from the high-frequency processing unit 104.

The GNSS receiver 100 includes a switching unit 108. The switching unit 108 is connected to the satellite capturing unit 106. The switching unit 108 switches the input destination of the intermediate-frequency signal from the GNSS satellite captured by the satellite capturing unit 106.

The GNSS receiver 100 includes a multipath error reduction unit 110. The multipath error reduction unit 110 is connected to the switching unit 108. The multipath error reduction unit 110 examines the correlation between the intermediate-frequency signal input from the switching unit 108 and the C/A code replica signal to thereby detect a correlation peak. The chip spacing to be used for detecting a correlation peak is switched in accordance with the signal intensity level of the correlation peak. For example, when the correlation peak is higher than or equal to a predetermined correlation value threshold, the process of obtaining a correlation peak with a wide spacing is switched to the process of obtaining a correlation peak with a narrow spacing. In addition, when the correlation peak is lower than the predetermined correlation value threshold while the process of obtaining a correlation peak is being performed with a narrow spacing, the process is switched to the process of obtaining a correlation peak with a wide spacing. In other words, control for obtaining a correlation peak with a wide spacing and control for obtaining a correlation peak with a narrow spacing are switched.

The multipath error reduction unit 110 includes a phase control tracking processing unit 1102. The phase control tracking processing unit 1102 is connected to the switching unit 108. The phase control tracking processing unit 1102 examines the correlation between the intermediate-frequency signal input from the switching unit 108 and the C/A code replica signal to thereby detect a correlation peak. When the correlation peak is detected, the phase of the C/A code replica signal is controlled with a wide spacing. For example, the phase control tracking processing unit 1102 controls the phase of the C/A code replica signal with a 1-chip spacing to thereby obtain a correlation peak. The 1 chip is an example, and may be changed appropriately. The phase control tracking processing unit 1102 inputs the correlation peak to a pseudo-range calculation unit 114 and a signal intensity level determination unit 112.

The multipath error reduction unit 110 includes a multipath reduction unit 1104. The multipath reduction unit 1104 is connected to the switching unit 108. The multipath reduction unit 1104 examines the correlation between the intermediate-frequency signal input from the switching unit 108 and the C/A code replica signal to thereby detect a correlation peak. When the correlation peak is detected, the phase of the C/A code replica signal is controlled (tracking is performed) with a narrow spacing. For example, the multipath reduction unit 1104 controls the phase of the C/A code replica signal with a 0.1-chip spacing to thereby obtain a correlation peak. The 0.1 chip is an example, and may be changed appropriately. A spacing narrower than the spacing used by the phase control tracking processing unit 1102 is used. The multipath reduction unit 1104 inputs the correlation peak to the pseudo-range calculation unit 114 and the signal intensity level determination unit 112.

The GNSS receiver 100 includes the signal intensity level determination unit 112. The signal intensity level determination unit 112 is connected to the multipath error reduction unit 110 and the switching unit 108. The signal intensity level determination unit 112 instructs the switching unit 108 to input the intermediate-frequency signal to the multipath reduction unit 1104 when the signal intensity level of the correlation peak input from the multipath error reduction unit 110 is higher than or equal to a predetermined correlation value threshold. In addition, the signal intensity level determination unit 112 instructs the switching unit 108 to input the intermediate-frequency signal to the phase control tracking processing unit 1102 when the signal intensity level of the correlation peak input from the multipath error reduction unit 110 is lower than the correlation value threshold.

Figure 9:
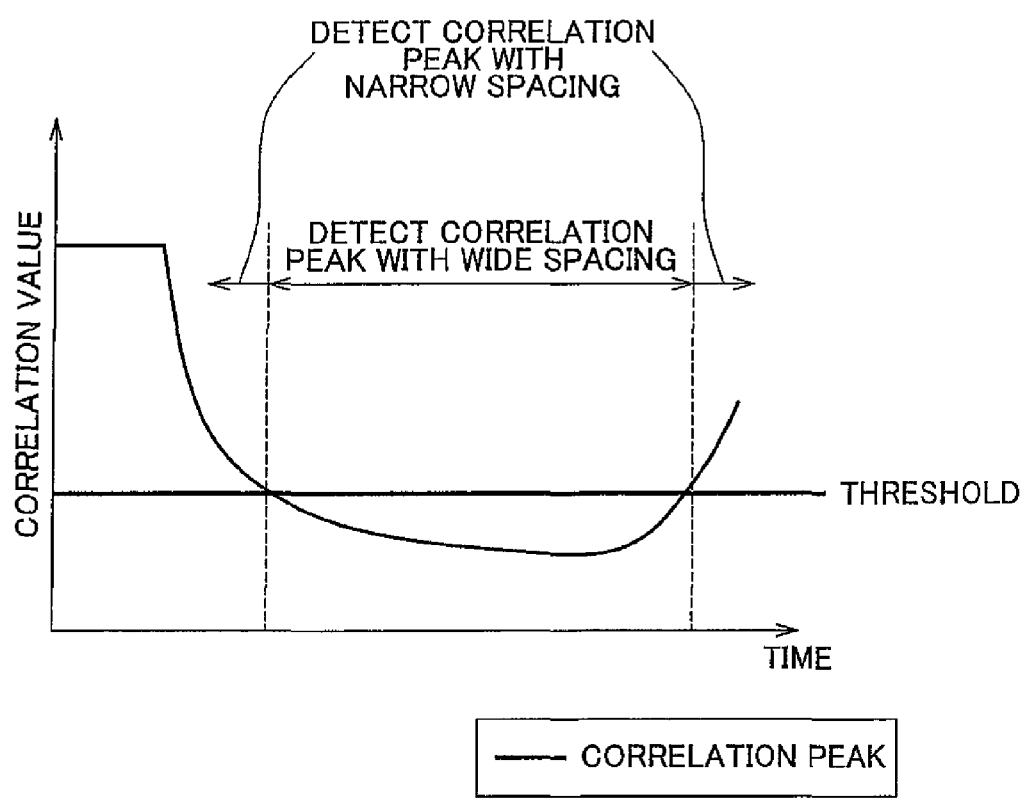
FIG. 9 is a view that illustrates a threshold of a correlation value in the GNSS receiver according to the embodiment of the invention.

FIG. 9 shows an example of variations of the correlation value of the correlation peak over time. FIG. 9 shows an example of setting of a correlation value threshold. The correlation value threshold is set on the basis of whether a correlation peak can be detected in such a manner that the phase of the C/A code replica signal is controlled with a narrow spacing. As the correlation peak decreases, it is more difficult to detect the correlation peak. In the example shown in FIG. 9, with a lapse of time, the correlation value of the correlation peak gradually decreases and then gradually increases from certain time. The signal intensity level determination unit 112 determines that a correlation peak should be detected by controlling the phase of the C/A code replica signal with a wide spacing when it is determined that the signal intensity level of the correlation peak input from the phase control tracking processing unit 1102 or the multipath reduction unit 1104 is lower than the correlation value threshold. This is because it is assumed that it is impossible to control the phase of the C/A code replica signal with a narrow spacing. When it is determined that a correlation peak should be detected by controlling the phase of the C/A code replica signal with a wide spacing, the signal intensity level determination unit 112 instructs the switching unit 108 to input the intermediate-frequency signal input from the satellite capturing unit 106 to the phase control tracking processing unit 1102.

On the other hand, when it is determined that the signal intensity level of the correlation peak is higher than or equal to the correlation value threshold, the signal intensity level determination unit 112 determines that a correlation peak should be detected by controlling the phase of the C/A code replica signal with a narrow spacing. This is because it is assumed that it is possible to control the phase of the C/A code replica signal with a narrow spacing. When it is determined that a correlation peak should be detected by controlling the phase of the C/A code replica signal with a narrow spacing, the signal intensity level determination unit 112 instructs the switching unit 108 to input the intermediate-frequency signal input from the satellite capturing unit 106 to the multipath reduction unit 1104.

The GNSS receiver 100 includes the pseudo-range calculation unit 114. The pseudo-range calculation unit 114 is connected to the multipath error reduction unit 110. The pseudo-range calculation unit 114 obtains a pseudo-range on the basis of the correlation peak input from the multipath error reduction unit 110. For example, the pseudo-range calculation unit 114 calculates a phase delay of the correlation peak to thereby obtain a pseudo-range. The pseudo-range calculation unit 114 inputs the pseudo-range to a positioning calculation unit 116.

The GNSS receiver 100 includes the positioning calculation unit 116. The positioning calculation unit 116 is connected to the pseudo-range calculation unit 114. The positioning calculation unit 116 calculates a current location of the GNSS satellite in world coordinates on the basis of the satellite orbit information contained in the navigation message. Note that the GNSS satellite is one of artificial satellites, so the movement of the GNSS satellite is limited within a certain plane (orbital plane) that includes the center of gravity of Earth. In addition, the orbit of the GNSS satellite forms an ellipse having one focal point at the center of gravity of Earth, and the location of the GNSS satellite in the orbital plane may be calculated by sequentially numerically calculating Kepler's equation. In addition, the location of the GNSS satellite may be obtained by converting the location of the GNSS satellite in the orbital plane into three-dimensional rotating coordinates in consideration of the rotational relationship between the orbital plane of the GNSS satellite and the equatorial plane of the world coordinates. Note that the world coordinates are defined by X-axis and Y-axis that are perpendicular to each other within the equatorial plane and Z-axis that is perpendicular to both X-axis and Y-axis with the center of gravity of Earth set as an origin.

The positioning calculation unit 116 positions the location of the GNSS receiver 100 on the basis of the calculated satellite locations and the computed pseudo-ranges input from the pseudo-range calculation unit 114. The location of the GNSS receiver 100 may be derived on the basis of the principle of triangulation using satellite pseudo-ranges and satellite locations that are obtained respectively for three GNSS satellites. When the location of the GNSS receiver 100 is derived on the basis of the principle of triangulation, the satellite pseudo-ranges each include a time error, so a satellite pseudo-range and a satellite location that are obtained for the fourth GNSS satellite are used to remove a time error component. The positioning calculation unit 110 outputs a current location.

Note that a positioning method for the location of a GNSS satellite is not limited to such sole positioning; the positioning method may be interferometric positioning (mode in which received data at a fixed station installed at a known point are used together). In the case of interferometric positioning, the location of the GNSS receiver 100 is positioned using, for example, single phase differences or double phase differences of pseudo-ranges that are obtained respectively by the fixed station and the GNSS receiver 100.

Figure 10:
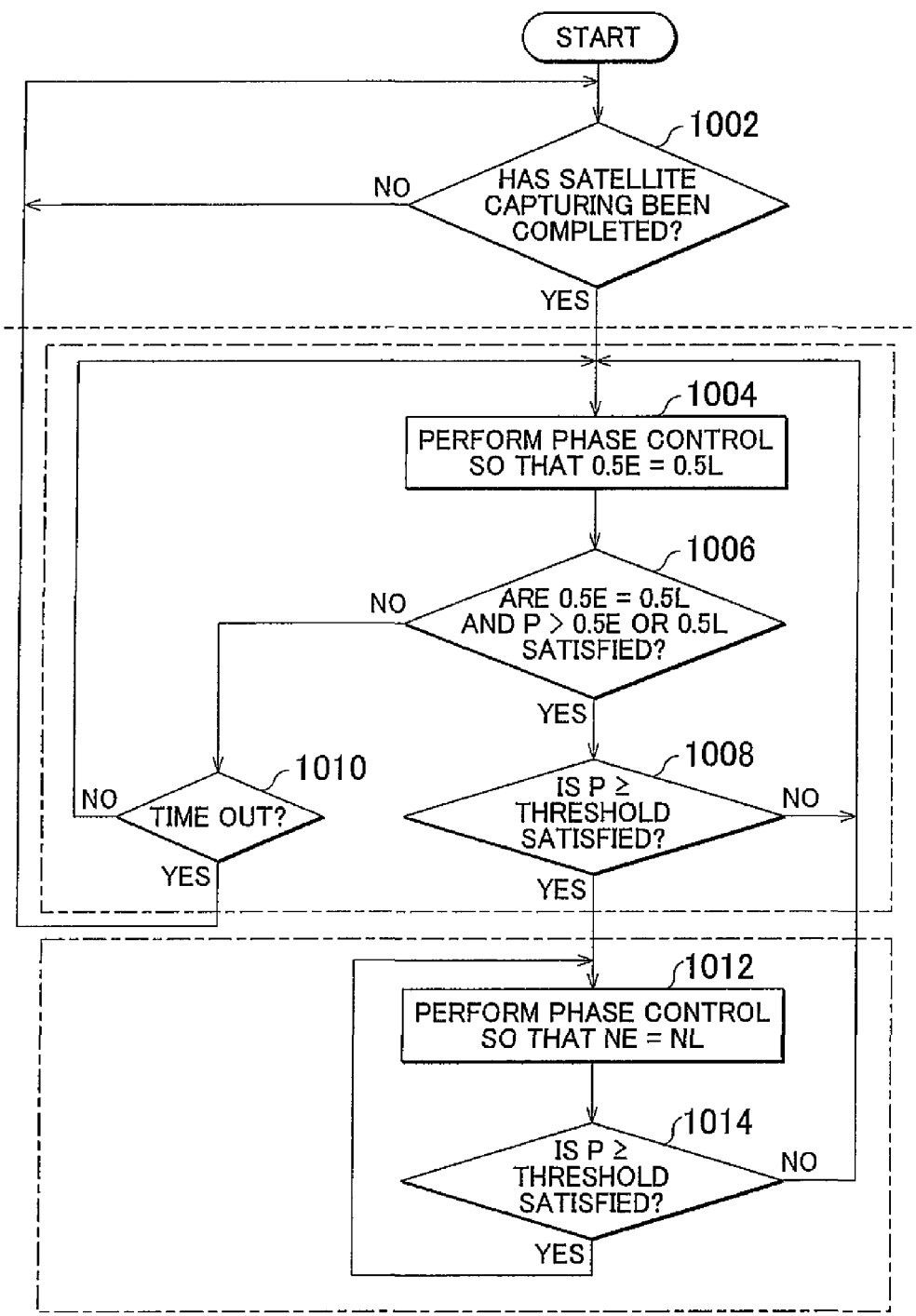
FIG. 10 is a flowchart that shows a positioning method used in the GNSS receiver according to the embodiment of the invention.

FIG. 10 shows the operation of the GNSS receiver 100.

The GNSS receiver 100 determines whether satellite capturing has been completed (step S1002). For example, a radio wave transmitted from a GNSS satellite is input to the high-frequency processing unit 104 via the antenna 102. The high-frequency processing unit 104 converts a high-frequency signal from the antenna 102 to an intermediate-frequency signal. The intermediate-frequency signal is input to the satellite capturing unit 106, and the satellite capturing unit 106 captures the GNSS satellite on the basis of the intermediate-frequency signal.

The GNSS receiver 100 examines the correlation between a positioning signal from the GNSS satellite captured in step S1002 and a C/A code replica signal (step S1004). The GNSS receiver 100 performs phase control with a wide spacing so that the signal intensity levels of correlation values at both ends of the spacing are equal to each other. For example, immediately after the GNSS receiver 100 is started up, the switching unit 108 inputs a signal input from the satellite capturing unit 106 to the phase control tracking processing unit 1102. The phase control tracking processing unit 1102 examines the correlation between the input signal and the C/A code replica signal. The phase control tracking processing unit 1102 controls the phase of the C/A code replica signal with a wide spacing. For example, the phase control is performed so that the signal intensity levels of correlation values at both ends of a wide spacing are equal to each other. For example, the phase control is performed so that the signal intensity levels (0.5E and 0.5L) of correlation values at both ends of a 1-chip spacing are equal to each other.

The GNSS receiver 100 performs the phase control so that a correlation value at a chip in the middle between a chip corresponding to 0.5E and a chip corresponding to 0.5L becomes a maximum value. The GNSS receiver 100 determines whether 0.5E and 0.5L are equal to each other and the maximum value (correlation peak) P is higher than 0.5E or 0.5L (step S1006). For example, the phase control tracking processing unit 1102 performs the phase control so that the signal intensity levels of correlation values at both ends of 1-chip spacing are equal to each other, and adjusts the phase of the C/A code replica signal so that a tracking point in the middle of the spacing becomes maximum. The phase control tracking processing unit 1102 determines whether the signal intensity levels of correlation values at both ends of 1-chip spacing are equal to each other (0.5E=0.5L) and a correlation peak P that is the maximum value of the tracking point is higher than 0.5E or 0.5L (P>0.5E or 0.5L).

When it is determined that the signal intensity levels of correlation values at both ends of 1-chip spacing are equal to each other and the correlation peak P that is the maximum value of the tracking point is higher than 0.5E or 0.5L (YES in step S1006), the GNSS receiver 100 determines whether the signal intensity level of the correlation peak P is higher than a correlation value threshold (step S1008). For example, the phase control tracking processing unit 1102 inputs the signal intensity level of the correlation peak P to the signal intensity level determination unit 112. The signal intensity level determination unit 112 determines whether the signal intensity level of the correlation peak P input from the phase control tracking processing unit 1102 is higher than or equal to the correlation value threshold. By determining whether the signal intensity level of the correlation peak P is higher than or equal to the correlation value threshold, it is determined whether the phase of the C/A code replica signal may be controlled with a narrow spacing.

On the other hand, when it is not determined in step S1006 that the signal intensity levels of correlation values at both ends of 1-chip spacing are equal to each other and the correlation peak P that is the maximum value of the tracking point is higher than 0.5E or 0.5L (NO in step S1006), the GNSS receiver 100 determines whether a timeout has occurred (step S1010). For example, the phase control tracking processing unit 1102 determines whether a timeout has occurred.

When it is not determined that a timeout has occurred (NO in step S1010), the process returns to step S1004. Until a timeout occurs, the phase control tracking processing unit 1102 continues the process of examining the correlation between the positioning signal from the GNSS satellite captured in step S1002 and the C/A code replica signal and the process of determining whether the signal intensity levels of correlation values at both ends of 1-chip spacing are equal to each other and the correlation peak P that is the maximum value of the tracking point is higher than 0.5E or 0.5L. In other words, tracking is continued.

When it is determined that a timeout has occurred (YES in step S1010), the process returns to step S1002. When a timeout has occurred, it is determined that it is impossible to perform satellite tracking, and then satellite capturing is performed again. For example, the satellite capturing unit 106 performs satellite capturing on the basis of a signal from a GNSS satellite. When it is determined that satellite capturing is performed on the basis of a signal from a GNSS satellite, for example, the signal intensity level determination unit 112 inputs a command for instructing the satellite capturing unit 106 to perform satellite capturing again (hereinafter, referred to as "satellite recapturing command") to the switching unit 108. The switching unit 108 inputs the satellite recapturing command to the satellite capturing unit 106 in accordance with the command from the signal intensity level determination unit 112. The satellite capturing unit 106 performs satellite capturing again in accordance with the satellite recapturing command input from the switching unit 108.

When it is determined in step S1008 that the signal intensity level of the correlation peak P is higher than or equal to the correlation value threshold (YES in step S1008), the GNSS receiver 100 controls the phase of the C/A code replica signal with a narrow spacing. For example, the phase control is performed so that the signal intensity levels of correlation values at both ends of a narrow spacing are equal to each other (step S1012). For example, the phase control is performed so that the signal intensity levels (NE and NL) of correlation values at both ends of a 0.1-chip spacing are equal to each other. By performing the phase control so that the signal intensity levels of correlation values at both ends of a narrow spacing are equal to each other, it is possible to obtain the signal intensity levels (NE and NL) of correlation values at chips closer to the chip corresponding to the correlation peak obtained with a 1-chip spacing. For example, when the signal intensity level determination unit 112 determines that the signal intensity level of the correlation peak P input from the phase control tracking processing unit 1102 is higher than or equal to the correlation value threshold, the signal intensity level determination unit 112 instructs the switching unit 108 to input the signal input from the satellite capturing unit 106 to the multipath reduction unit 1104. As a result of the instruction, the signal from the satellite capturing unit 106 is input to the multipath reduction unit 1104. The multipath reduction unit 1104 examines the correlation between the input signal and the C/A code replica signal. The multipath reduction unit 1104 controls the phase of the C/A code replica signal with a narrow spacing. For example, the phase control is performed so that the signal intensity levels (NE and NL) of correlation values at both ends of a 0.1-chip spacing are equal to each other. The phase control is performed so that NE is equal to NL, and the phase of the C/A code replica signal is adjusted to maximize a tracking point in the middle of the spacing.

The GNSS receiver 100 determines whether the signal intensity level of the correlation peak P is higher than or equal to the correlation value threshold (step S1014). For example, the multipath reduction unit 1104 inputs the signal intensity level of the correlation peak P to the signal intensity level determination unit 112. The signal intensity level determination unit 112 determines whether the signal intensity level of the correlation peak P input from the multipath reduction unit 1104 is higher than or equal to the correlation value threshold.

When it is determined that the signal intensity level of the correlation peak P is higher than or equal to the correlation value threshold (YES in step S1014), the process returns to step S1012. The GNSS receiver 100 controls the phase of the C/A code replica signal with a narrow spacing to thereby continue the process of detecting a correlation peak. For example, the multipath reduction unit 1104 examines the correlation of the C/A code replica signal with the input signal from the switching unit 108 by controlling the phase of the C/A code replica signal. The multipath reduction unit 1104 controls the phase of the C/A code replica signal with a narrow spacing.

On the other hand, when it is not determined that the signal intensity level of the correlation peak P is higher than or equal to the correlation value threshold, that is, when the signal intensity level of the correlation peak P is lower than the correlation value threshold (NO in step S1014), the process returns to step S1004. The GNSS receiver 100 detects correlation by controlling the phase of the C/A code replica signal with a wide spacing. For example, the multipath reduction unit 1104 inputs the signal intensity level of the correlation peak P to the signal intensity level determination unit 112. When the signal intensity level determination unit 112 determines that the signal intensity level of the correlation peak is lower than the correlation value threshold, the signal intensity level determination unit 112 instructs the switching unit 108 to input the signal input from the switching unit 108 to the phase control tracking processing unit 1102. The switching unit 108 inputs the signal input from the satellite capturing unit 106 to the phase control tracking processing unit 1102 in accordance with the instruction. The phase control tracking processing unit 1102 examines the correlation between the C/A code replica signal and the input signal by controlling the phase of the C/A code replica signal. The phase control tracking processing unit 1102 controls the phase of the C/A code replica signal with a wide spacing.

In the flowchart shown in FIG. 10, the process of obtaining a correlation peak is mainly described; however, positioning calculation is also performed in parallel with the process of obtaining the correlation peak.

For example, when it is determined in step S1006 that the signal intensity levels of correlation values at both ends of 1-chip spacing are equal to each other and the correlation peak P that is the maximum value of the tracking point is higher than 0.5E or 0.5L (YES in step S1006), the phase control tracking processing unit 1102 inputs the correlation peak to the pseudo-range calculation unit 114. The pseudo-range calculation unit 114 obtains a pseudo-range on the basis of the correlation peak input from the phase control tracking processing unit 1102. The pseudo-range is input to the positioning calculation unit 116. The positioning calculation unit 116 positions the location of the GNSS receiver 100 on the basis of the calculated satellite locations and the computed pseudo-ranges input from the pseudo-range calculation unit 114.

In addition, for example, when it is determined in step S1014 whether the signal intensity level of the correlation peak P is higher than or equal to the correlation value threshold, the multipath reduction unit 1104 inputs the correlation peak P to the pseudo-range calculation unit 114. The pseudo-range calculation unit 114 obtains a pseudo-range on the basis of the correlation peak input from the multipath reduction unit 1104. The pseudo-range is input to the positioning calculation unit 116. The positioning calculation unit 116 positions the location of the GNSS receiver 100 on the basis of the calculated satellite locations and the computed pseudo-ranges input from the pseudo-range calculation unit 114.

In the present embodiment, the signal intensity level determination unit 112 may determine whether the signal intensity level of a predetermined correlation value is higher than a correlation value threshold when the phase control tracking processing unit 1102 controls the phase of the C/A code replica signal with a wide spacing. For example, it is also applicable that it is determined whether the signal intensity levels of correlation values at both ends of a wide spacing are higher than a correlation value threshold. The correlation value threshold may be different from the correlation value threshold used in determination of a correlation peak. When the signal intensity level of correlation values at both ends of a wide spacing are subjected to determination, the phase control tracking processing unit 1102 inputs the signal intensity levels of correlation values at both ends of a wide spacing to the signal intensity level determination unit 112.

In addition, the signal intensity level determination unit 112 may determine whether the signal intensity level of a predetermined correlation value is higher than a correlation value threshold when the multipath reduction unit 1104 controls the phase of the C/A code replica signal with a narrow spacing to detect correlation. It is applicable that it is determined whether the signal intensity levels of correlation values at both ends of a narrow spacing are higher than a correlation value threshold. The correlation value threshold may be different from the correlation value threshold used in determination of a correlation peak. When the signal intensity levels of correlation values at both ends of a narrow spacing are subjected to determination, the multipath reduction unit 1104 inputs the signal intensity levels of correlation values at both ends of a narrow spacing to the signal intensity level determination unit 112.

In addition, the signal intensity level determination unit 112 may determine the signal intensity level of a real-time correlation value. In addition, the signal intensity level determination unit 112 may calculate the average of correlation values input from the phase control tracking processing unit 1102 or the multipath reduction unit 1104 during a constant time interval and then may determine whether the average is higher than a correlation value threshold. In addition, the signal intensity level determination unit 112 may accumulate correlation values input from the phase control tracking processing unit 1102 or the multipath reduction unit 1104 during a constant time interval and then may determine whether the accumulated value is higher than a correlation value threshold.

According to the present embodiment, it is determined whether the signal intensity level of a correlation value is higher than or equal to a correlation value threshold that is used for determining whether the phase of the CIA code replica signal may be controlled with a narrow spacing. When it is determined that the signal intensity level of the correlation value is lower than the correlation value threshold, it is determined that a correlation peak cannot be detected by controlling the phase of the C/A code replica signal with a narrow spacing, so the process is switched to the process of detecting a correlation peak by controlling the phase of the C/A code replica signal with a wide spacing. The process is switched to correlation detection with a wide spacing, so this does not lead to a situation that the process of controlling the phase of the C/A code replica signal with a narrow spacing is continued to disable the phase control of the C/A code replica signal. Because the phase control of the CIA code replica signal is not disabled, it is possible to reduce the probability of losing satellite tracking.

On the other hand, when it is determined that the signal intensity level of the correlation value is higher than or equal to the correlation value threshold, it is determined that a correlation peak may be detected by controlling the phase of the C/A code replica signal with a narrow spacing, so the process is switched to the process of detecting a correlation peak by controlling the phase of the C/A code replica signal with a narrow spacing. The process is switched to the process of detecting a correlation peak by controlling the phase of the C/A code replica signal with a narrow spacing, so the influence of multipath may be reduced.

According to the present embodiment, the GNSS receiver that performs positioning calculation on the basis of a positioning signal transmitted from a GNSS satellite is provided.

The GNSS receiver includes: a first correlation peak detecting unit that serves as a phase control tracking processing unit and that detects a peak of a correlation value between the positioning signal and a C/A code replica signal; a second correlation peak detecting unit that serves as a multipath reduction unit and that detects a peak of the correlation value between the positioning signal and the C/A code replica signal through a multipath error reduction technique; a signal intensity detecting unit that serves as a phase control tracking processing unit, a multipath reduction unit and a signal intensity level determination unit and that detects a signal intensity of the positioning signal; a switching unit that inputs the positioning signal to the second correlation peak detecting unit when the signal intensity detected by the signal intensity detecting unit is higher than or equal to a predetermined threshold, and that inputs the positioning signal to the first correlation peak detecting unit when the signal intensity is lower than the predetermined threshold; a pseudo-range calculation unit that calculates a pseudo-range on the basis of the correlation peak detected by the first correlation peak detecting unit or the second correlation peak detecting unit; and a positioning calculation unit that calculates a location of the GNSS receiver on the basis of the pseudo-range calculated by the pseudo-range calculation unit.

It is determined whether the signal intensity of the positioning signal is higher than or equal to a threshold that is used for determining whether the phase of the C/A code replica signal may be controlled with a narrow spacing. When it is determined that the signal intensity level is lower than the threshold, the process is switched to the process of detecting a correlation peak by controlling the phase of the C/A code replica signal with a wide spacing; whereas, when it is determined that the signal intensity is higher than or equal to the threshold, the process is switched to the process of detecting a correlation peak by controlling the phase of the C/A code replica signal with a narrow spacing. By switching to a wide spacing, it is possible to reduce the probability of losing satellite tracking. By switching to a narrow spacing, it is possible to reduce the influence of multipath.

Furthermore, the first correlation peak detecting unit detects a peak of the correlation value between the positioning signal and the C/A code replica signal with a first phase spacing, and the second correlation peak detecting unit detects a peak of the correlation value between the positioning signal and the C/A code replica signal with a second phase spacing that is narrower than the first phase spacing.

By detecting a peak of the correlation value between the positioning signal and the C/A code replica signal with the second phase spacing that is narrower than the first phase spacing, it is possible to reduce the influence of multipath.

Furthermore, the signal intensity detecting unit detects a predetermined first correlation value when the first correlation peak detecting unit detects a peak of the correlation value between the positioning signal and the C/A code replica signal, and the switching unit inputs the positioning signal to the second correlation peak detecting unit when a signal intensity of the predetermined first correlation value detected by the signal intensity detecting unit is higher than or equal to a predetermined threshold, and inputs the positioning signal to the first correlation peak detecting unit when the signal intensity of the first correlation value is lower than the predetermined threshold.

When the peak of the correlation value between the positioning signal and the C/A code replica signal is detected, the predetermined first correlation value is detected. In other words, it is possible to use the first correlation value as a signal intensity. It is possible to switch between detecting a correlation peak with a wide spacing and detecting a correlation peak with a narrow spacing on the basis of the first correlation value.

Furthermore, the signal intensity detecting unit detects a predetermined second correlation value when the second correlation peak detecting unit detects a peak of the correlation value between the positioning signal and the C/A code replica signal, and the switching unit inputs the positioning signal to the second correlation peak detecting unit when a signal intensity of the predetermined second correlation value detected by the signal intensity detecting unit is higher than or equal to a predetermined threshold, and inputs the positioning signal to the first correlation peak detecting unit when the signal intensity of the predetermined second correlation value is lower than the predetermined threshold.

When the peak of the correlation value between the positioning signal and the C/A code replica signal is detected, the predetermined second correlation value is detected. In other words, it is possible to use the second correlation value as a signal intensity. It is possible to switch between detecting a correlation peak with a wide spacing and detecting a correlation peak with a narrow spacing on the basis of the second correlation value.

Furthermore, the multipath error reduction technique includes any one of a narrow-correlator, an early-late slope, a strobe-correlator and a multipath estimating delay-lock loop.

The influence of multipath may be reduced by any one of a narrow-correlator, an early-late slope, a strobe-correlator and a multipath estimating delay-lock loop.

According to the present embodiment, the positioning method used in a GNSS receiver that performs positioning calculation on the basis of a positioning signal transmitted from a GNSS satellite is provided.

The positioning method includes: a first correlation peak detecting step of detecting a peak of a correlation value between the positioning signal and a C/A code replica signal; a second correlation peak detecting step of detecting a peak of the correlation value between the positioning signal and the C/A code replica signal through a multipath error reduction technique; a signal intensity detecting step of detecting a signal intensity of the positioning signal; a switching step of switching to the second correlation peak detecting step when the signal intensity detected in the signal intensity detecting step is higher than or equal to a predetermined threshold and switching to the first correlation peak detecting step when the signal intensity is lower than the predetermined threshold; a pseudo-range calculation step of calculating a pseudo-range on the basis of the correlation peak detected in the first correlation peak detecting step or the second correlation peak detecting step; and a positioning calculation step of calculating a location of the GNSS receiver on the basis of the pseudo-range calculated in the pseudo-range calculation step.

As described above, the aspect of the invention is described with reference to the specific embodiment; however, the above embodiment is only illustrative, and a person skilled in the art may understand various modifications, alterations, alternatives, replacements, and the like. For the sake of easy description, the device according to the embodiment of the invention is described using the functional block diagram; however, such a device may be implemented by hardware, software or a combination of them. The aspect of the invention is not limited to the above embodiment; the aspect of the invention encompasses various modifications, alterations, alternatives, replacements, and the like, without departing from the spirit of the invention.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. A GNSS receiver that performs positioning calculation on the basis of a positioning signal transmitted from a GNSS satellite, comprising:
    a first correlation peak detecting unit that detects a peak of a correlation value between the positioning signal and a C/A code replica signal;
    a second correlation peak detecting unit that detects a peak of the correlation value between the positioning signal and the C/A code replica signal through a multipath error reduction technique;
    a signal intensity detecting unit that detects a signal intensity of the positioning signal received at the GNSS receiver;
    a switching unit that inputs the positioning signal to the second correlation peak detecting unit when the signal intensity detected by the signal intensity detecting unit at the peak of the correlation value is higher than or equal to a predetermined threshold, and that inputs the positioning signal to the first correlation peak detecting unit when the signal intensity at the peak of the correlation value is lower than the predetermined threshold;
    a pseudo-range calculation unit that calculates a pseudo-range on the basis of the peak of the correlation value detected by the first correlation peak detecting unit or the second correlation peak detecting unit; and
    a positioning calculation unit that calculates a location of the GNSS receiver on the basis of the pseudo-range calculated by the pseudo-range calculation unit,
    wherein the first correlation peak detecting unit uses a first phase spacing to detect a peak of the correlation value between the positioning signal and the C/A code replica signal, and
    wherein the second correlation peak detecting unit uses a second phase spacing that is narrower than the first phase spacing to detect a peak of the correlation value between the positioning signal and the C/A code replica signal.

2. The GNSS receiver according to claim 1, wherein
    the signal intensity detecting unit detects a predetermined first correlation value when the first correlation peak detecting unit detects a peak of the correlation value between the positioning signal and the C/A code replica signal, and
    the switching unit inputs the positioning signal to the second correlation peak detecting unit when a signal intensity of the predetermined first correlation value detected by the signal intensity detecting unit is higher than or equal to a predetermined threshold, and inputs the positioning signal to the predetermined first correlation peak detecting unit when the signal intensity of the first correlation value is lower than the predetermined threshold.

3. The GNSS receiver according to claim 1, wherein
    the signal intensity detecting unit detects a predetermined second correlation value when the second correlation peak detecting unit detects a peak of the correlation value between the positioning signal and the C/A code replica signal, and
    the switching unit inputs the positioning signal to the second correlation peak detecting unit when a signal intensity of the predetermined second correlation value detected by the signal intensity detecting unit is higher than or equal to a predetermined threshold, and inputs the positioning signal to the first correlation peak detecting unit when the signal intensity of the predetermined second correlation value is lower than the predetermined threshold.

4. The GNSS receiver according claim 1, wherein the multipath error reduction technique includes any one of a narrow-correlator, an early-late slope, a strobe-correlator and a multipath estimating delay-lock loop.

5. A positioning method used in a GNSS receiver that performs positioning calculation on the basis of a positioning signal transmitted from a GNSS satellite, comprising:
    detecting a first correlation peak that is a peak of a correlation value between the positioning signal and a C/A code replica signal;
    detecting a second correlation peak that is a peak of the correlation value between the positioning signal and the C/A code replica signal through a multipath error reduction technique;
    detecting a signal intensity of the positioning signal received at the GNSS receiver;
    detecting the second correlation peak when the detected signal intensity at the peak of the correlation value is higher than or equal to a predetermined threshold and detecting the first correlation peak when the detected signal intensity at the peak of the correlation value is lower than the predetermined threshold;
    calculating a pseudo-range on the basis of the detected first correlation peak or the detected second correlation peak; and
    calculating a location of the GNSS receiver on the basis of the calculated pseudo-range,
    wherein the first correlation peak is detected with a first phase spacing; and
    wherein the second correlation peak is detected with a second phase spacing that is narrower than the first phase spacing.

* * * * *